US006045712A

United States Patent [19]
Yarbrough et al.

[11] Patent Number: 6,045,712
[45] Date of Patent: Apr. 4, 2000

[54] MICROMACHINED REFLECTOR ANTENNA METHOD

[75] Inventors: Allyson D. Yarbrough, Hermosa Beach; Samuel S. Osofsky, Torrance; Ruby E. Robertson, Los Angeles; Robert C. Cole, Rancho Palos Verdes, all of Calif.

[73] Assignee: The Aerospace Corporation, El Segundo, Calif.

[21] Appl. No.: 09/030,540

[22] Filed: Feb. 23, 1998

[51] Int. Cl.[7] .............................. C23F 1/00; H01B 13/00; B29D 11/00

[52] U.S. Cl. .................................. 216/2; 216/13; 216/17; 216/24; 216/26; 438/52; 438/701; 438/702; 438/739

[58] Field of Search ................................ 216/13, 17, 24, 216/26, 2; 438/52, 701, 702, 739

[56] References Cited

PUBLICATIONS

"Integrated Horn Antennas for Millimeter–Wave Applications", G. Rebeiz and D. Rutledge, Ann. Telecommun. 47, pp. 38–48, 1992.

"Microfabricated Hinges", K.S.J. Pister, N.W. Judy, S.R. Burgett, R.S. Fearing, Sensors and Actuators, A. 33, pp. 249–256, 1992.

"Applying Micro–Nanotechnology to Satellite Communications Systems", A.D. Yarbrough, ART–93 (8349)–1, The Aerospace Corporation, Mar. 31, 1993.

*Primary Examiner*—Necholus Ogden
*Attorney, Agent, or Firm*—Derrick Michael Reid

[57] ABSTRACT

A method of manufacturing a micromachined reflector antenna onto a substrate firstly etches a reflector aperture surface defining a dish cavity in an oxide layer and secondly rotates a hinge over the reflector aperture surface with the hinge being used as the reflector central feed. The micromachined reflector can be made into an array of reflector antennas and integrated onto a single substrate with front end receiver circuits operating as a high frequency receiver on a chip reduced in size and cost and operating at hundreds of GHz.

7 Claims, 4 Drawing Sheets

REFLECTOR FEED RELEASE AND POSITIONING

MEMS INTEGRATED RECEIVER

SPIN ON GLASS AND METALIZATION

FEED FORMATION

RECEIVER APERTURE FORMATION

REFLECTOR METALIZATION

REFLECTOR FEED RELEASE AND POSITIONING

MICROMACHINED REFLECTOR ANTENNA METHOD

REFERENCE TO RELATED APPLICATION

The present application is related to applicant's co-pending application entitled Micromachined Monolithic Reflector Antenna System, Ser. No. 09/028,584, filed Feb. 18, 1998, by the same inventors.

STATEMENT OF GOVERNMENT INTEREST

The invention was made with Government support under Contract No. F04701-93-C-0094 by the Department of the Air Force. The Government has certain rights in the invention. The invention described herein may be manufactured and used by and for the government of the United States for governmental purpose without payment of royalty therefor.

FIELD OF THE INVENTION

The invention relates to the fields of reflector and antenna designs and micromachined and MicroElectroMechanical Systems (MEMS). More particularly, the present invention relates to the MEMS reflectors and antennas.

BACKGROUND OF THE INVENTION

Processing techniques developed in the semiconductor industry are now being exploited in the development of microscopic machines and sensors. Broadly known as microelectromechanical systems (MEMS), these components include microscopic motors, actuators, accelerometers, microgrippers, digital micromirror devices, and fluistors (fluidic transistor valves). Components used in radio-based communications and wireless sensing systems such as horn antennas, bolometers, high-frequency circuit probes, and other passive elements may be desirable as MEMS, for use in many applications, such as, small satellites.

Spacecraft communication systems have benefited significantly from advances made in microelectronics and very large-scale integration processes. During the past two decades the scale of integration, the materials available, the batch-production yields, the reliability, and the raw performance of high-frequency and high-speed components have steadily improved. Many frequency and speed requirements previously met by large, weighty components are now achievable by miniature, lightweight, and highly reliable devices. A wide variety of monolithic microwave integrated circuit subsystems operating between one and approximately 100 GHz have demonstrated their functional, as well as commercial, viability. And with the current intense interest in exploiting the less-crowded microwave and millimeter wave frequency bands for communications, availability of small-scale structures and devices is critical. Pursuit of micro-communications subsystems will lead to reductions in weight and size, both primary components of satellite costs. MEMS technology stands to make a significant impact to obtain the smallest possible spacecraft mass while still fulfilling design objectives. Emphasis is now placed on reducing the weight of individual spacecraft subsystems. The success of MEMS and general trends toward miniaturization in such areas as propulsion, guidance, navigation, attitude control, thermal control, pressure and temperature sensing, and power could significantly benefit satellite communications systems.

It is desirable for communications satellites to use higher frequencies, to avoid not only terrestrial microwave-link congestion and noise but also traffic from other users. There are also other considerable advantages. First, the beamwidth of an antenna narrows as the frequency increases, that is, the beamwidth of an antenna is inversely proportional to both the antenna aperture and the frequency of transmission, so greater numbers of satellites can relay to the same ground antenna without interfering with each other. Second, moving to higher frequencies also allows the use of smaller onboard satellite antennas, reducing weight. At millimeter-wave frequencies, electrically large but physically small antenna structures become feasible because of the short wavelengths involved. Finally, in the 2–4 GHz C-band, limits are imposed on radiated power to prevent interference with terrestrial microwave links. These limits either do not exist or are greatly relaxed at the higher frequencies. At frequencies much above C-band, the electronics in the receiver produce most of the noise that competes with the desired signal. However, at frequencies above 10 GHz, the atmospheric absorption of RF signals causes massive propagation losses. To overcome these losses, operation at higher, less-congested frequency regimes requires not only components that deliver much higher performance, but also highly sophisticated ground stations with larger antennas. Also, oxygen and water absorption resonances occur between 60 GHz and 125 GHz, providing opportunities for intersatellite communications that are virtually immune to interference or jamming from the ground. As components of sufficiently high performance are developed and become available, it will be desirable to design satellites that take full advantage of these frequencies.

A typical communications payload is one quarter of the dry mass of a satellite. Applying micromachining technology to payloads can achieve significant savings in weight and cost. For example, a waveguide used for routing signal energy between and within subsystems, can be integrated into the bulk substrate of a microwave integrated circuit, reducing the need for external metal waveguide sections and combiners. Presently, the silicon or gallium arsenide substrate upon which microwave integrated circuits are fabricated provides a mechanical support for the active semiconductor layers and the metalization and may serve as a heat sink.

Mobile systems and dynamic communication networks can be made more compact and versatile by micromachining and exploiting unused substrate volume. Personal communications systems increasingly require the use of lightweight, low-cost receivers. A large number of compact circuits of modest performance can be produced. Micromachining technology can meet the need for integrated subsystems by using semiconductor substrate material for multilevel and buried interconnects.

The development of micromachining technology would allow inexpensive, batch-fabricated devices to be used in personal communication systems. Miniature horn and reflector antennas as well as arrays have been investigated and some have been fabricated with the use of available micromachining techniques. An integrated horn antenna for millimeter-wave applications has been suggested and a 802 GHz imaging array, double polarized antennas, monopulse antennas, and high-gain, step-profiled, diagonal-horn antennas have been proposed. The integrated horn antenna included a pyramidal horn cavity at the bottom of which is a dipole antenna. The pyramidal horn cavity is fabricated on one substrate, while the dipole antenna element is deposited on a thin membrane fabricated on a separate wafer. These two, and subsequent wafers required, are then carefully stacked, aligned and bonded or fused together to complete the antenna structure. These components offer high-frequency operation but do not include a MEMS reflector antenna having a central feed suspended entirely above the plane of the cavity aperture, all on a single wafer.

Additionally, as the frequency of operation of a subsystem increases, packaging and interconnect schemes assume critical importance. Often high performance can be achieved by advanced circuit designs which may be compromised by inefficient intrachip paths and packaging that leads to bottlenecks and losses. Communication systems presently use discrete antennas and reflectors, which are interfaced to the front-end of receiver systems via waveguide, coaxial or planar interconnects. However, these external connections to receiver circuits can inject noise into the received signal path, limiting the ability to distinguish low-level signals in the presence of noise. Reflectors and antennas, typically have central feeds suspended above the reflector. Whiles MEMS processes can release a structure to be suspended, MEMS processes have not been applied to the manufacture of integrated reflectors having central feeds suspended above the plane of the cavity aperture on a single wafer. These and other disadvantages are solved or reduced using the invention.

SUMMARY OF THE INVENTION

An object of the present invention is to provide a microelectromechanical systems (MEMS) reflector antenna on a substrate having a suspended integrated feed.

Another object of the present invention is to provide a MEMS reflector array on a single substrate that has a suspended integrated feed.

Another object of the invention is to provide an integrated receiver having a MEMS reflector and front end communication receiver circuits integrated on a single substrate.

The present invention is directed to the function and fabrication of micromachined reflector antenna arrays integrated on the same wafer as an integrated receiver for use in communication systems. A microelectromechanical systems (MEMS) reflector is formed on a substrate preferably integrated with a front end receiver circuit on the substrate chip for high frequency low noise wireless communication. The operating frequency range of interest for these reflectors is in the approximate millimeter-wavelength range above thirty GHz. Fabrication can use existing semiconductor batch-processing techniques. The reflector and receiver circuit combine to produce a millimeter-wave front end receiver on a chip.

The invention is a method of manufacturing a MEMS reflector by having a reflector surface etched into the reflector layer and then rotating a hinge over the reflector surface with the hinge then functioning as a reflector central feed. The reflector is made preferably by etching a reflector dish cavity into a spin-on glass film or appropriate substrate surface and then rotating a hinge at one end with the other end released. The hinge is positioned in the center of the reflector dish cavity. The front end receiver consists of an antenna or reflector, and an integrated feed network connecting the antenna to the low-noise amplifier. The small size of the individual MEMS reflectors provides high frequency operation. The integration of the reflector array on a substrate also supporting the low noise amplifier reduces noise and losses in the received-signal path to improve the reception of low-level high frequency signals. Multiple wafer layers of material are not required to fabricate the array. These and other advantages will become more apparent from the following detailed description of the preferred embodiment.

DETAILED DESCRIPTION OF THE PREFERRED EMBODIMENT

Figure 1:
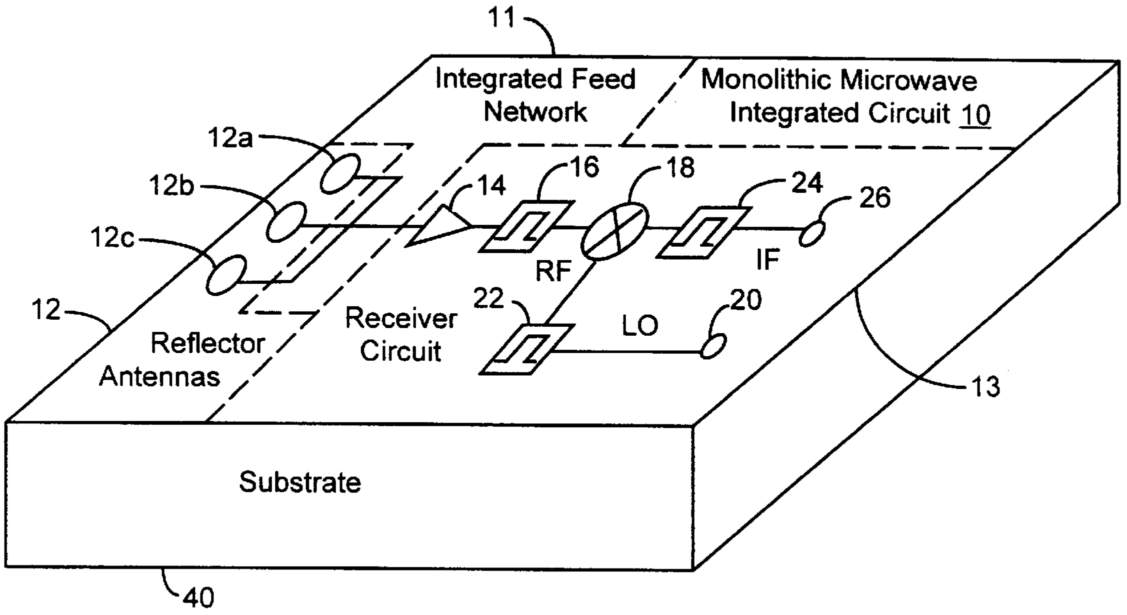
FIG. 1 depicts a microelectromechanical systems (MEMS) integrated receiver having both reflector antennas and front end receiver circuits integrated on a single substrate.
Figure 2A:
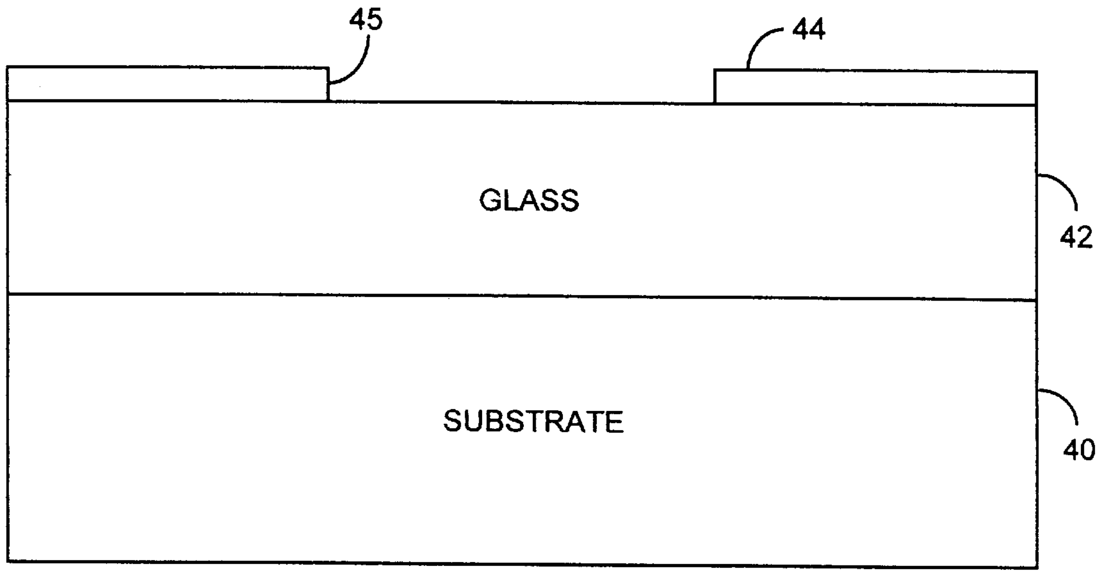
FIGS. 2*a–e* are diagrams of a substrate to be processed to form a MEMS reflector on the substrate.
Figure 2B:
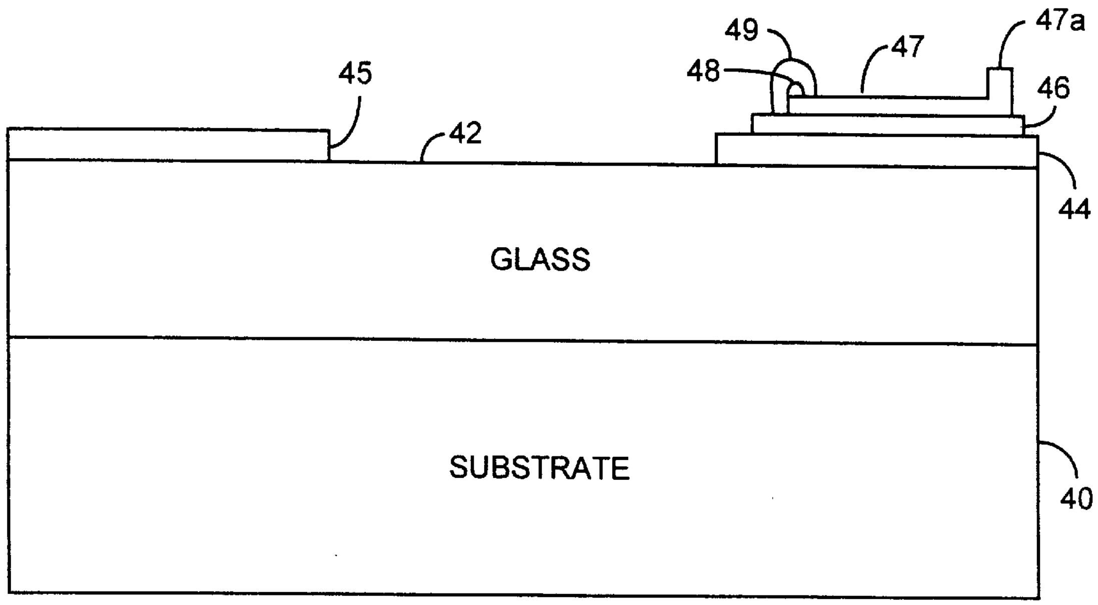
Figure 2C:
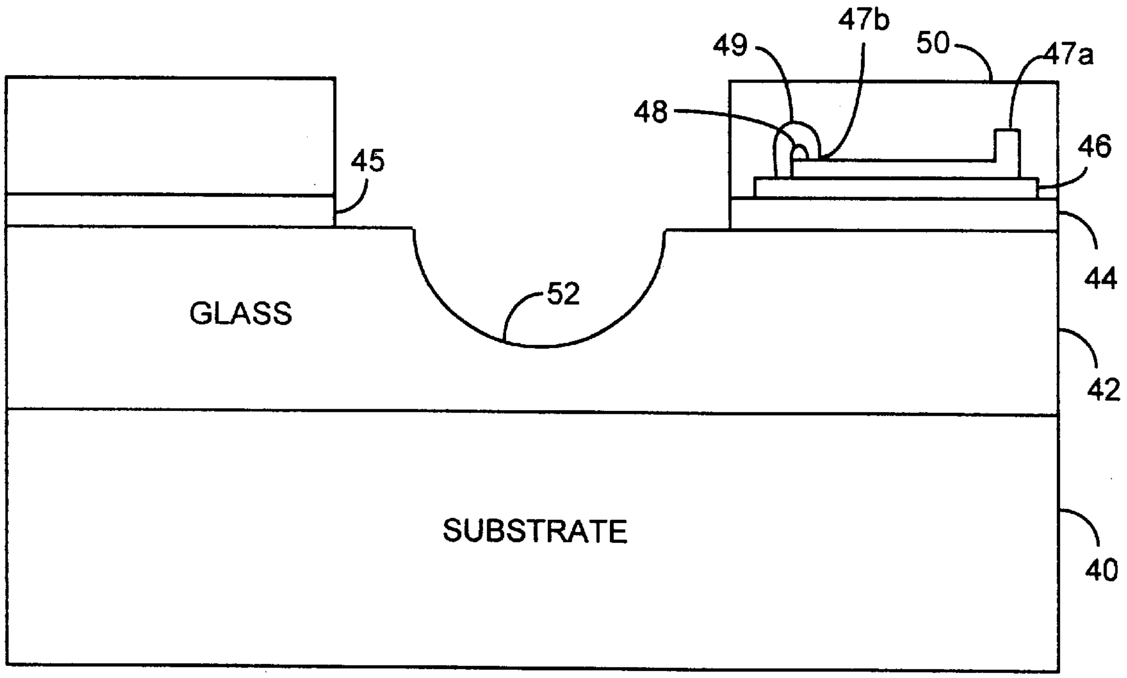
Figure 2D:
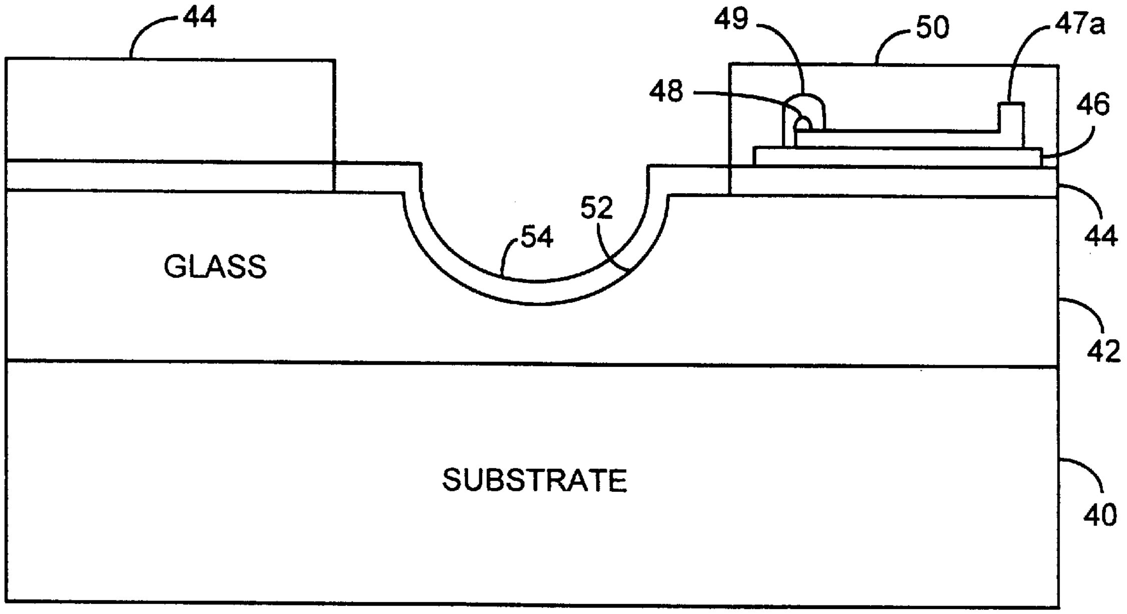
Figure 2E:
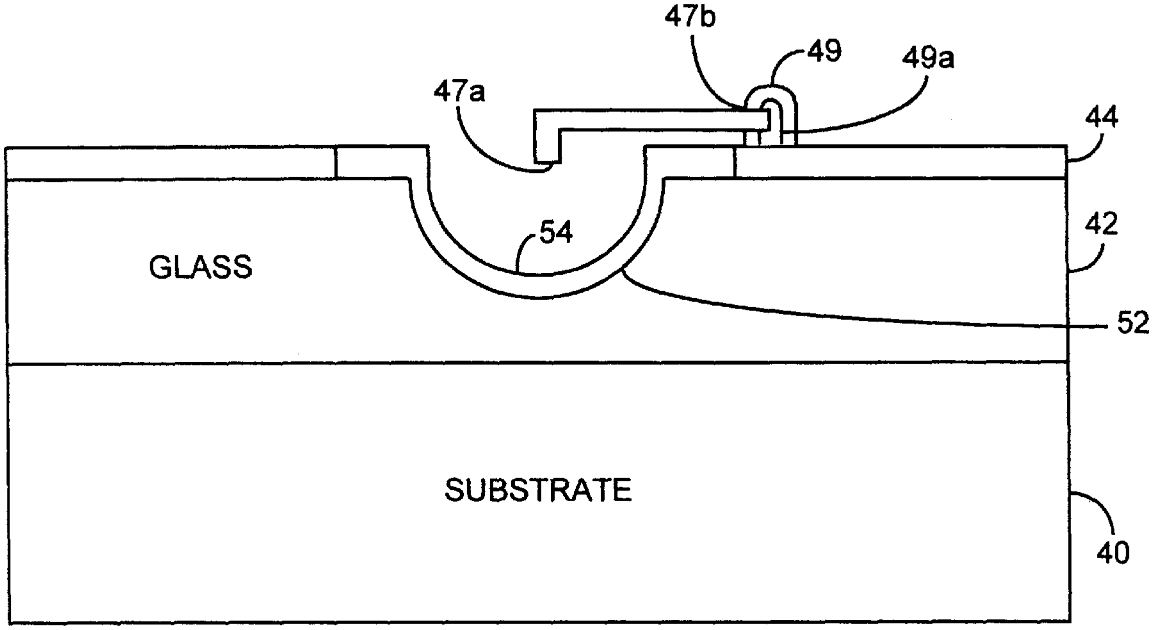

An embodiment of the invention is described with reference to the figures using reference designations as shown in the figures. Referring to FIG. 1, a monolithic microwave integrated circuit 10 is an integrated front end receiver system comprising an integrated feed network 11 connected to reflector antennas 12 comprises a plurality of reflector antennas 12*a–c*. The antennas 12 are connected to a front end receiver circuit 13 through the network 11. The receiver circuit 13 is of a conventional design using conventional integrated semiconductor processes. The receiver circuit 13 comprises by way of example, a low noise amplifier 14, a band pass filter 16 providing a radio frequency RF signal to a mixer 18 receiving a local oscillator (LO) signal 20 through another band pass filter 22 for down converting a received RF signal into an IF signal. The mixer 18 provides the IF signal to another band pass filter 24 which provides an intermediate frequency (IF) signal 26 as an output. The reflectors 12*a–c* are made using microelectromechanical systems (MEMS) processes and conventional semiconductor processes as more clearly depicted in FIGS. 2*a–e*.

Referring to FIGS. 2*a–e,* a MEMS reflector is preferably made upon a substrate 40 with a surface of appropriate crystalline orientation. The substrate may be bulk silicon. The substrate 40 has a thick dielectric, such as an oxide or spin-on glass deposited as a film 42 and disposed on top of the substrate 40. A metal film 44 is then deposited on top of the oxide film 42 and then patterned. The metal film 44 should be a low-resistivity, refractory metal such as tungsten, capable of withstanding the high temperatures of the subsequent polysilicon processes. The opening 45 in the patterned metal film 44 defines the diameter of the MEMS reflector. Both the thickness of the representative oxide film 42 and the diameter are determined by the desired frequency of operation.

A first sacrificial layer 46, preferably of silicon dioxides is deposited on the metal film 44 and patterned and etched. A feed beam 47 is deposited on the sacrificial layer 46. The feed beam 47 is preferably made of polysilicon. The feed beam 47 is a narrow beam portion of a hinge. The beam portion 47 has a hole 47*b* at a proximal hole end of the beam portion with a feed tip 47*a* at a distal tip end which is to be suspended over the reflector. A second sacrificial layer is deposited and patterned providing coverage over the proximal end of the feed beam 47 and extends through the hole 47*b* of the beam portion 47 to the layer 46. Another polysilicon layer is deposited and patterned to form a staple portion 49 of the hinge consisting of beam 47 and staple 49. The staple portion 49 is patterned over the second sacrificial layer 48 and also extends through the hole of the beam portion 47 to the layer 46.

A first patterned silicon dioxide layer 50 is deposited over the feed 47, staple 49, layer 48, and metal 44 but not over the area defining the cavity of the reflector defined by pattern 45 of metal layer 44. An isotropic etch is used to create a bowl shaped surface 52 in the spin-on glass layer 42 to define the reflector surface. The layer 42 may also be made of silicon nitride, polyimide, other insulating films, silicon, gallium arsenide, or other semiconductor substrate material. A metal film 54 is deposited over the reflector surface 52 and the oxide layer 50 is then removed exposing the feed 47. The first and second sacrificial layers 46 and 48 are then etched to form an aperture 49*a* to release the feed beam 47. The feed beam 47 is then manually rotated about the staple portion 49 extending through the hole 47*b* in the proximal end of the beam 47 to the suspended position shown in FIG. 2*e*. The feed beam 47 after being released is mechanically supported by a staple portion 49 and layer 44.

Referring to all of the Figures, a suitable processing mask set provides for the formation of the integrated feed network 11 and for the formation of the interconnecting lines to connect the network to the receiver circuit 13. A dielectric material, such as, but not limited to, spin-on glass or polyimide can be deposited in the reflector aperture defined by film 54 so that the reflector functions as an electrically large reflector without increasing the very small physical size of the reflector. The approximate directivity between 100 and 300 GHz of a reflector antenna with 50% efficiency and 1 mm aperture diameter varies between 6.5 dB and 16 dB, respectively. The corresponding gain for such an antenna between these frequencies is approximately 3.5 dB and 12.5 dB.

The reflector formation process allows for the integration of the reflector antennas 12 to be integrated on the same single substrate 40 as the receiver circuits 13. This single substrate integration eliminates an external substrate interconnection between, for example, the reflector 12 and the low noise amplifier 14. The elimination of an off substrate interconnection reduces the potential for signal loss that directly degrades noise performance and sensitivity to desired signals of low levels. The reduction of substrate interconnects also more efficiently uses the surface area of the substrate 40. The micromachining processes are inherently compatible with the conventional semiconductor processes enabling the integration of the both MEMS reflectors and integrated receiver circuits on a single substrate. Those skilled in the art can make enhancements, improvements and modifications to enhance the invention. However, those enhancements, improvements and modifications may nonetheless fall within the spirit and scope of the following claims.

What is claimed is:

1. A method of manufacturing a reflector, the method comprising the steps of depositing a reflector layer on a substrate, etching a reflector surface into the reflector layer, forming a feed beam on the reflector layer, the feed beam has a distal feed end having a feed tip for suspension over the reflector and a proximal end having a hole for rotation, the feed beam is not formed over the reflector surface, forming a staple having an aperture for rotating the feed beam, the staple is secured to the substrate and extends through the hole, and rotating the feed beam about the staple to rotate the feed tip over the reflector surface.

2. The method of claim 1 wherein, the substrate is made of bulk silicon, the reflector layer is made of spin-on glass, and the feed beam is made of polysilicon.

3. The method of claim 1 further comprising the step of depositing a metal film on the reflector surface.

4. The method of claim 1 further comprising the steps of, depositing a sacrificial layer above the reflector layer and below the feed beam, and etching the sacrificial layer to release the feed beam from the substrate.

5. The method of claim 1 further comprising the steps of, depositing a first sacrificial layer above the reflector layer prior to forming the feed beam, depositing a second sacrificial layer above the proximal end of the feed beam prior to forming the staple above the proximal end, etching the first sacrificial layer to release the feed beam from the substrate, and etching the second sacrificial layer to enable the feed beam to rotate about the staple extending through the hole.

6. A method of manufacturing a receiver, the method comprising the steps of depositing a reflector layer on a substrate, forming a receiver on the substrate, etching a reflector surface into the reflector layer, forming a feed beam on the reflector layer, the feed beam has a distal tip end for suspension over the reflector surface and a proximal hole end for rotating, the feed beam is not formed over the reflector surface, releasing the feed beam from the reflector layer, rotating the feed beam about the proximal end around the staple to rotate the distal tip end over the reflector surface, and connecting the feed beam to the receiver.

7. The method of the claim 6 further comprising the steps of forming a feed network for connecting the feed beam to the receiver.

* * * * *